United States Patent [19]
Worthen, deceased et al.

[11] 3,888,337
[45] June 10, 1975

[54] REVERSIBLE REDUCTION GEAR SYSTEM AND BRAKE FOR MARINE DRIVE

[75] Inventors: Eugene P. Worthen, deceased, late of Braintree, Mass.; New England Merchant natl. Bank, executor, Braintree, Mass.

[73] Assignee: United Aircraft Corporation, East Hartford, Conn.

[22] Filed: July 5, 1973

[21] Appl. No.: 376,846

Related U.S. Application Data
[62] Division of Ser. No. 229,871, Feb. 28, 1972.

[52] U.S. Cl. ............ 192/4 C; 74/361; 192/21; 192/67 A
[51] Int. Cl. .................................. B60k 29/02
[58] Field of Search ............... 74/361; 192/21, 4 C

[56] References Cited
UNITED STATES PATENTS

| | | | |
|---|---|---|---|
| 2,536,897 | 1/1951 | Wood | 74/361 X |
| 2,559,740 | 7/1951 | Sinclair | 74/361 X |
| 2,741,137 | 4/1956 | Hindmarch | 192/4 C X |
| 2,741,351 | 4/1956 | Fletcher et al. | 192/21 X |
| 2,961,078 | 11/1960 | Shannon et al. | 192/4 C |
| 3,695,401 | 10/1972 | Nagasaki | 192/21 |

Primary Examiner—Benjamin W. Wyche
Attorney, Agent, or Firm—Vernon F. Hauschild

[57] ABSTRACT

A reversible reduction gear system for marine use in which each of one or more prime movers drive the bull gear through a split gear train and in which, when the direction of drive is to be changed, the entire main unit is stopped by brakes and then clutches shift from an ahead drive pinion to an astern drive pinion or vice versa.

8 Claims, 16 Drawing Figures

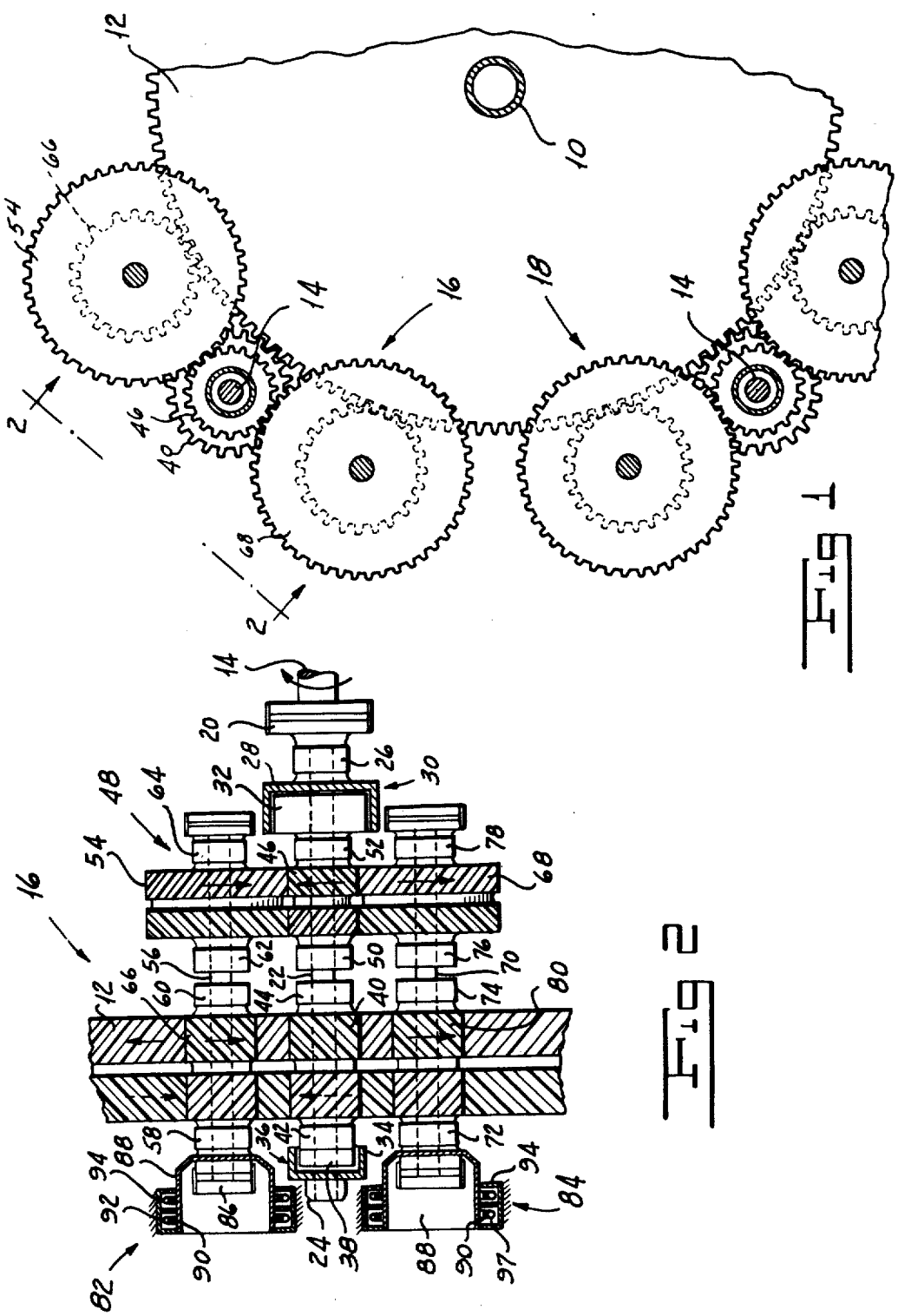

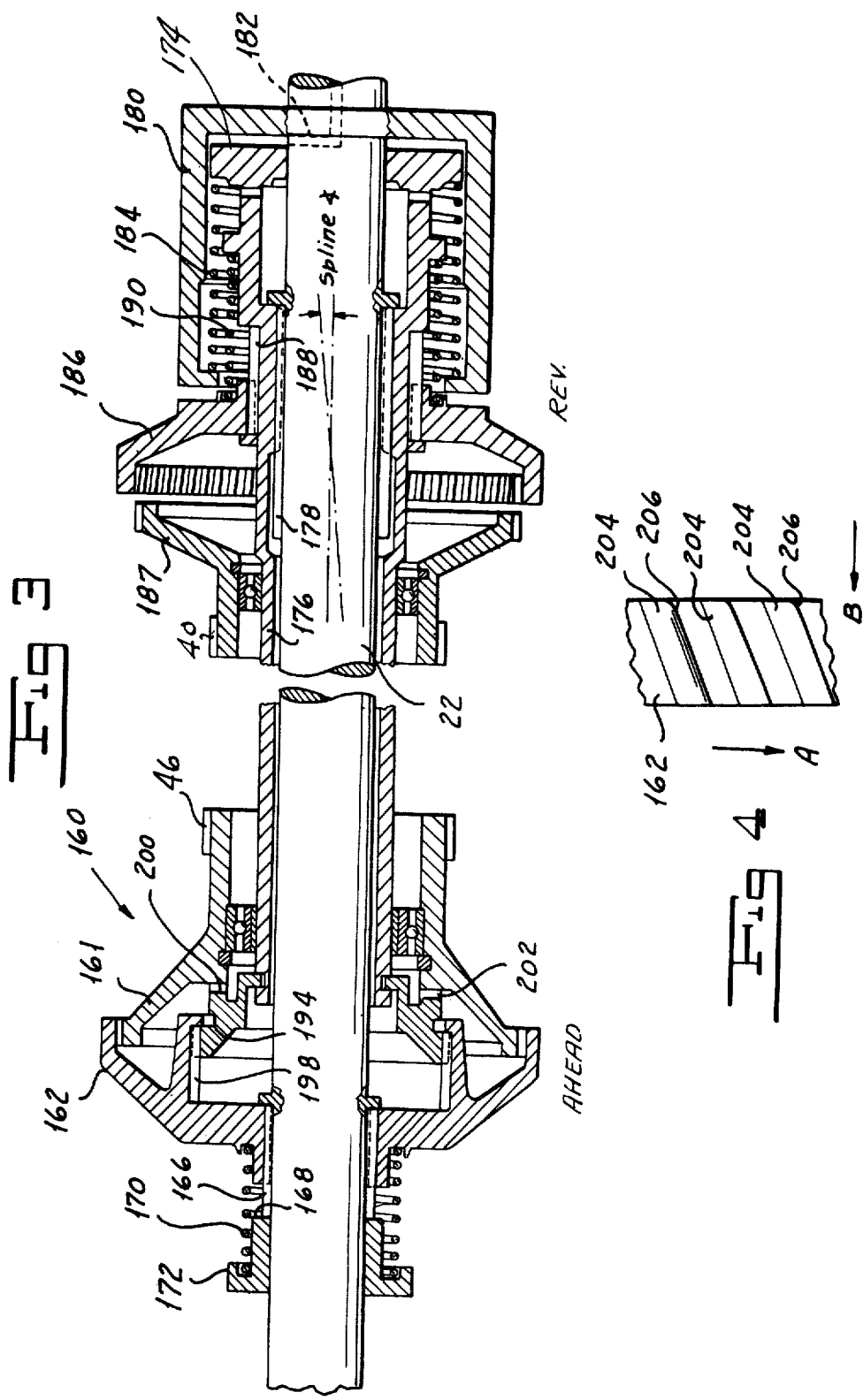

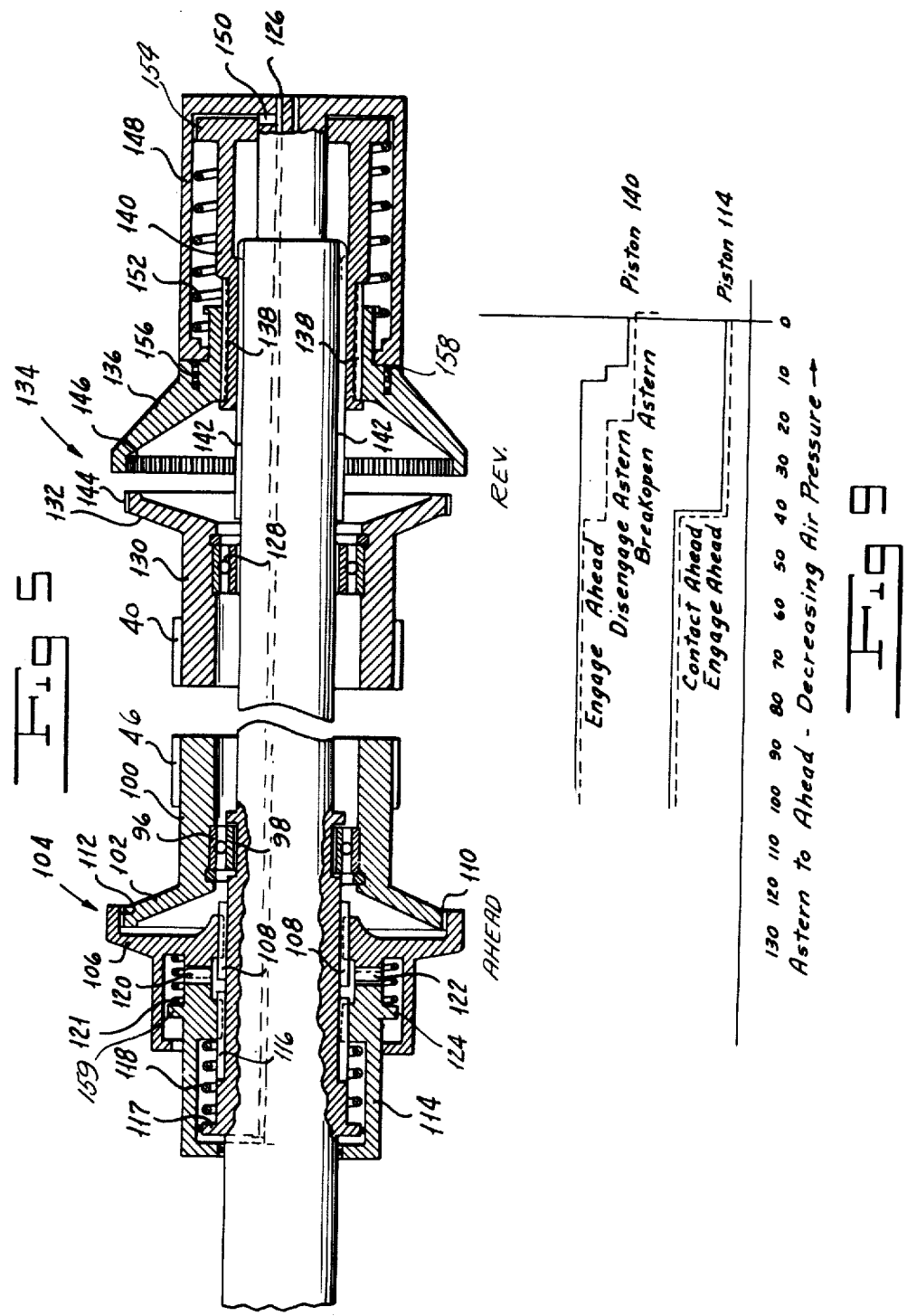

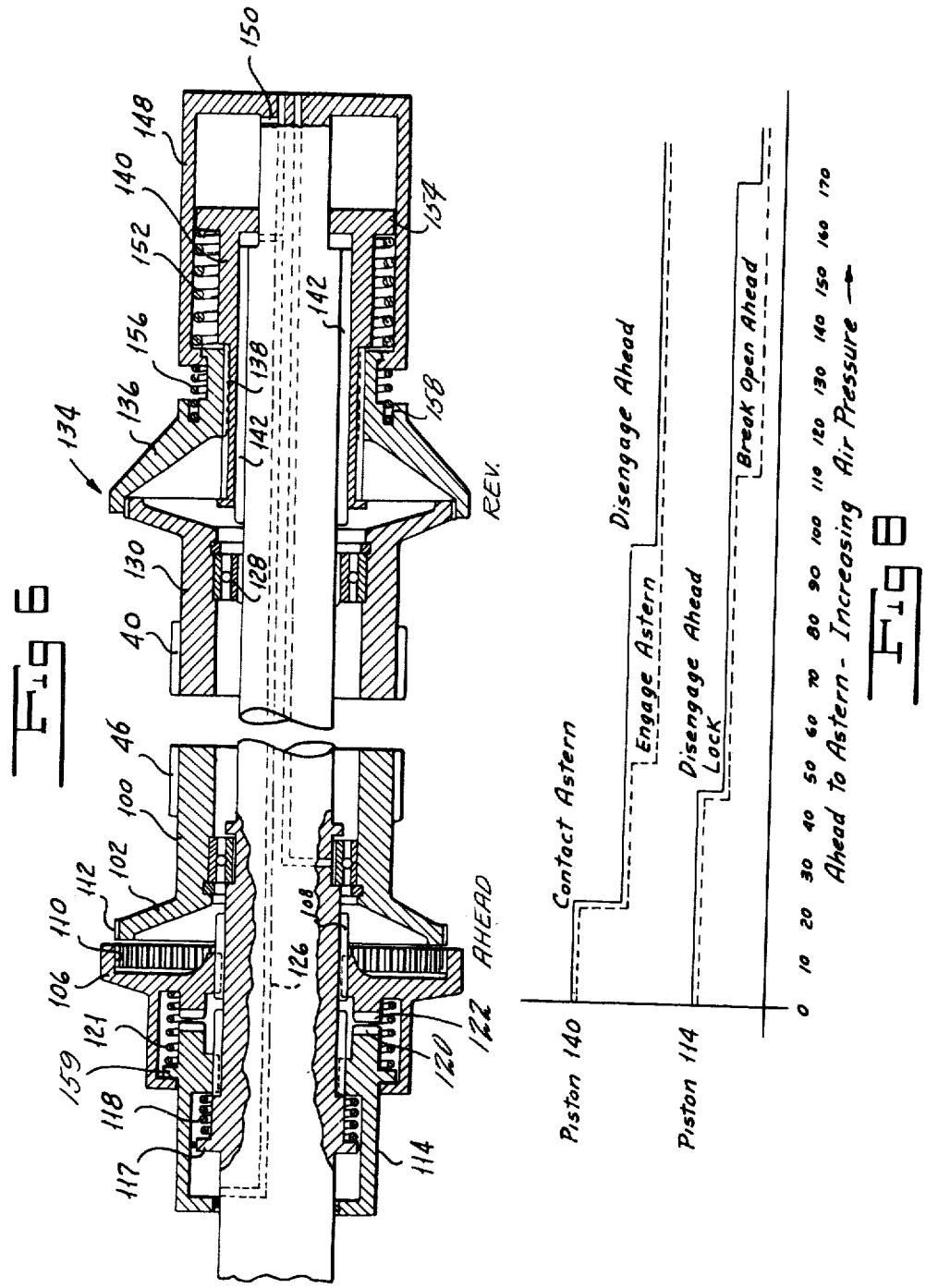

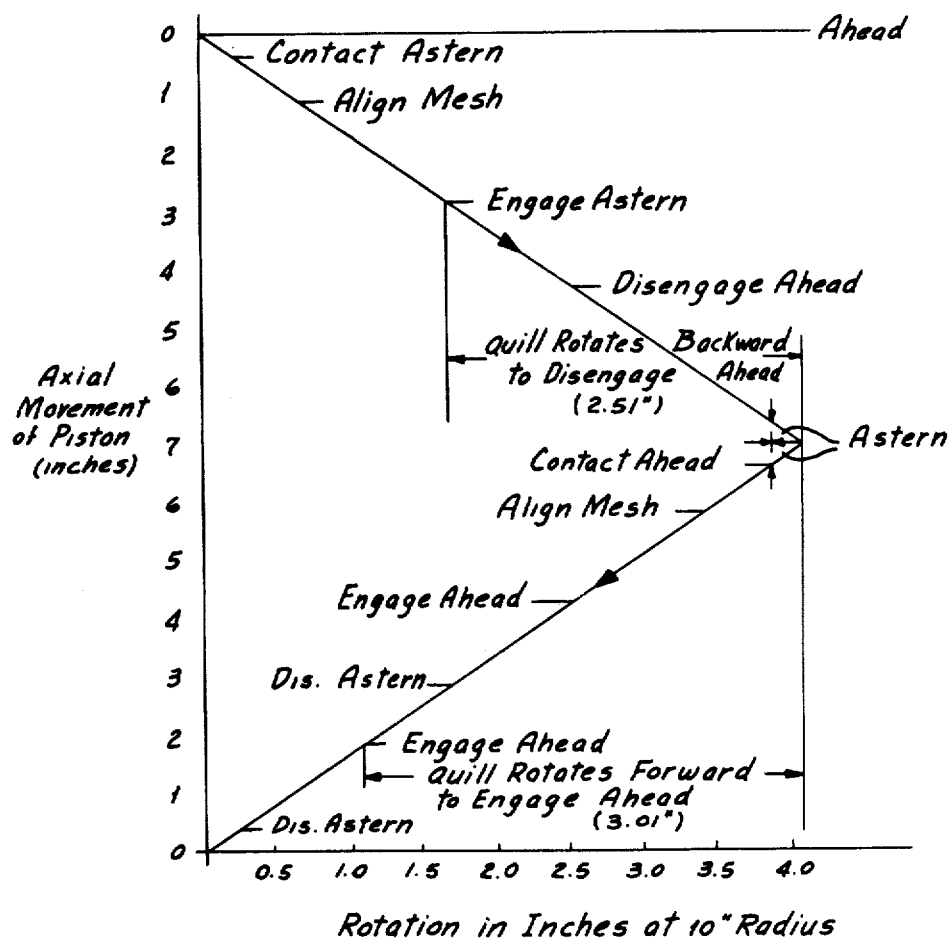

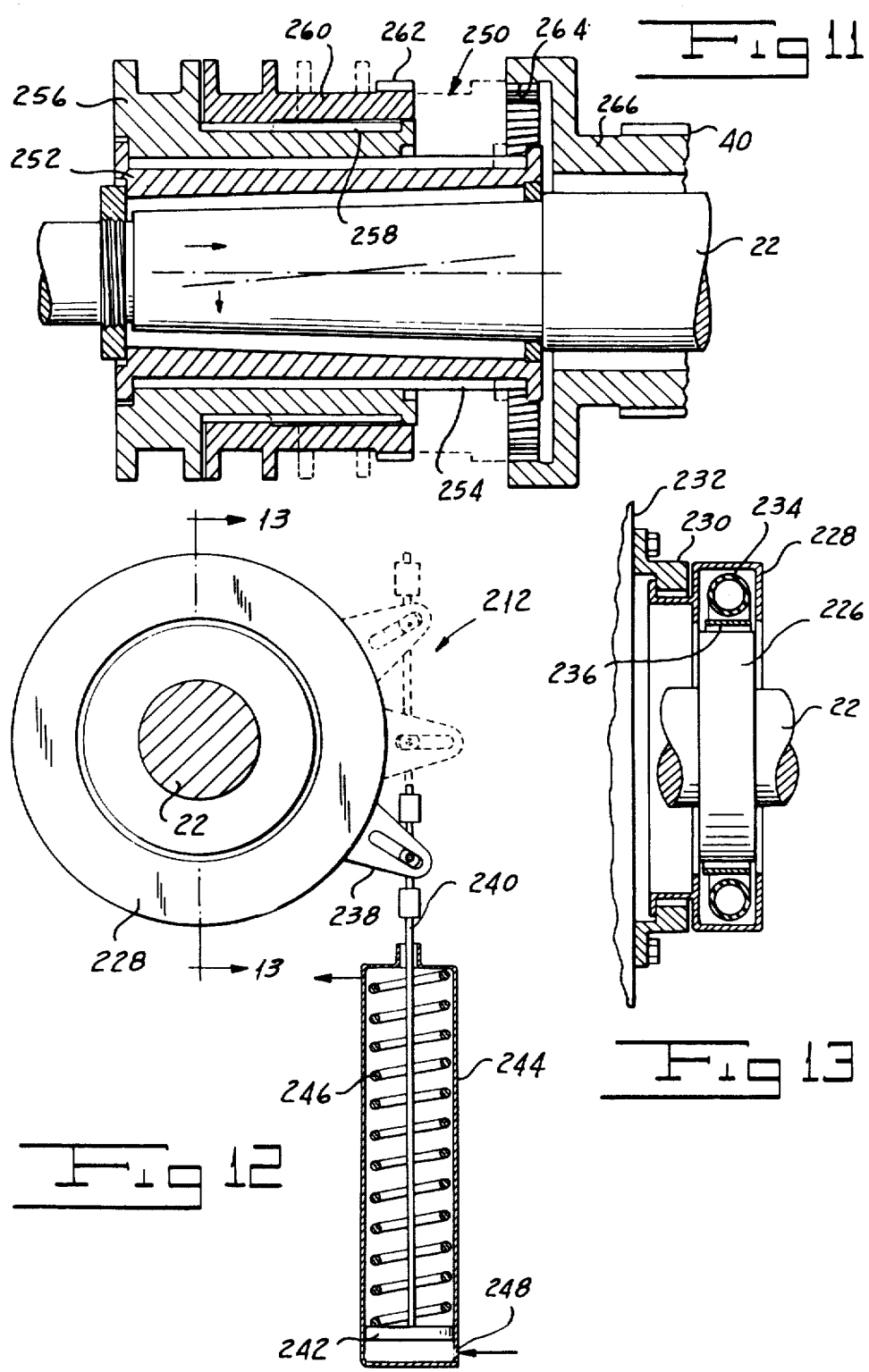

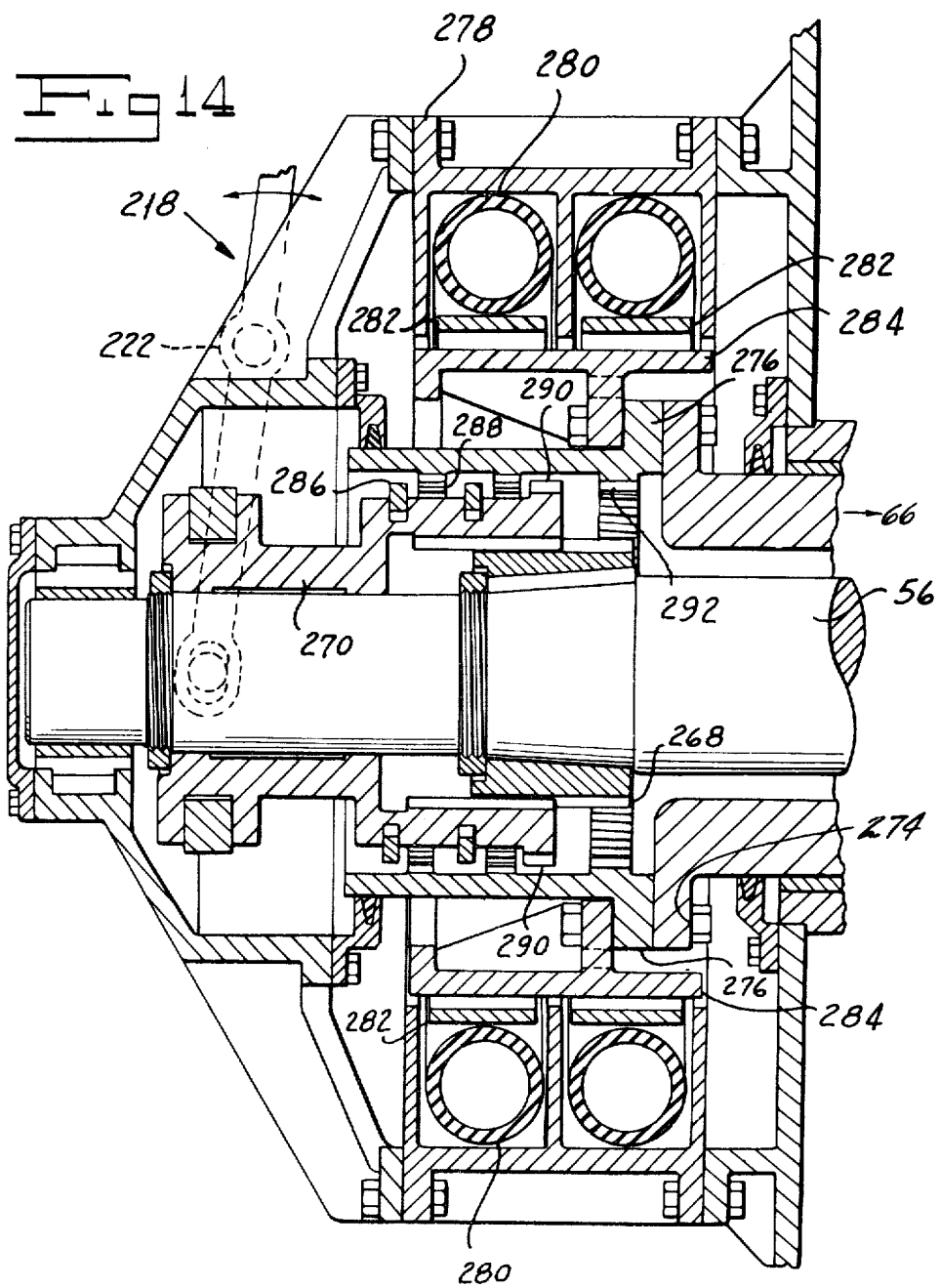

REVERSIBLE REDUCTION GEAR SYSTEM AND BRAKE FOR MARINE DRIVE

This is a division of application Ser. No. 229,871, filed Feb. 28, 1972.

BACKGROUND OF THE INVENTION

In marine propulsion systems, a prime mover such as a gas turbine or the like drives a bull gear attached to the propeller shaft through the medium of reduction gearing. Some means must be provided in an installation of this type for reversing the direction of thrust of the screw driven by the prime mover. Various systems have been proposed in the prior art for achieving this result.

One such system includes a controllable pitch propeller the pitch of which is reversed for maneuvering and for reverse operation of the vessel on which the system is installed. This arrangement requires the controllable pitch propeller, a complex operating mechanism in the long, hollow propeller shaft and large hydraulic pumps for driving the operating mechanism to change pitch. It will readily be appreciated that a complex installation of this type requires relatively frequent maintenance. More importantly, in order that such maintenance or repairs be accomplished, the vessel must be placed in dry dock for access to the operating mechanism, adding greatly to the cost of maintenance.

Another system which has been proposed in the prior art for marine use is a reversible gear together with ahead and astern friction clutches for coupling the gear to the prime mover. An arrangement of this type is costly, is extremely heavy and occupies a large space. In addition to these factors, failure of the clutches completely disables the vessel and repairs must be undertaken before the vessel can proceed. The clutches must be quite large since they are required to stop the shaft at one point in the course of a reversing operation. The drive pinions are large so that normally only a single turbine can be attached to the system.

A third arrangement which has been proposed in the prior art for marine propulsion is reversible gears with a mechanical drive combined with a hydraulic drive for maneuvering. This system is expensive, heavy and bulky. Moreover, it requires shifting from hydraulic to mechanical drive or vice versa while the ship is in motion with a consequent reduction in power.

I have invented a reversible reduction gear system for a marine drive which overcomes the defects of systems of the prior art discussed above. My system is less expensive to construct and to install than are most systems of the prior art. It weighs less than most systems heretofore known and occupies considerably less space. My system does not require dry docking of a vessel for maintenance. It does not necessitate shifting when the vessel is under way.

SUMMARY OF THE INVENTION

One object of my invention is to provide a reversible reduction gear system for marine use which overcomes the defects of reversing systems of the prior art.

Another object of my invention is to provide a reversible reduction gear system for marine use which is less expensive than are reversing gear systems of the prior art.

A further object of my invention is to provide a reversible reduction gear system for marine use which weighs less than do reversing gear systems of the prior art.

Still another object of my invention is to provide a reversible reduction gear system for marine use which occupies less space than do reduction gear systems of the prior art.

A still further object of my invention is to provide a reversible reduction gear system for marine use which fails safe.

Yet another object of my invention is to provide a reversible reduction gear system for marine use which does not require dry docking of the vessel for maintenance.

Other and further objects of my invention will appear in the following description.

In general my invention contemplates the provision of a reversible reduction gear system for marine use in which one or more prime movers such as gas turbines drive the screw shaft bull gear through split gear trains and in which brakes are first energized to stop the entire main unit upon a reversal and a shift is then made from the ahead pinion to the astern pinion or vice versa.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a fragmentary sectional view of my reversible reduction gearing for marine use.

FIG. 2 is a fragmentary view of my reversible reduction gearing system with parts shown in section taken along the line 2—2 of FIG. 1. FIG. 3 is a fragmentary sectional view of one form of clutching system for my reversible reduction gear system for a marine drive.

FIG. 4 is a fragmentary view illustrating the angularly disposed teeth of one of the clutches of the system shown in FIG. 3.

FIG. 5 is a fragmentary sectional view of an alternate clutching system for my reversible reduction gear system for a marine drive illustrating the relative positions of the parts during ahead drive operation.

FIG. 6 is a fragmentary sectional view of the clutching system shown in FIG. 5 illustrating the relative positions of the parts in the reverse drive direction.

FIG. 7 is a diagrammatic view illustrating the operation of the system of FIGS. 5 and 6 in terms of axial movement of the drive piston versus rotary displacement of the coupling element.

FIG. 8 is a diagrammatic view illustrating the operation of the system of FIGS. 5 and 6 in going from ahead to astern condition with relation to air pressure in the system.

FIG. 9 is a diagrammatic view illustrating the operation of the system of FIGS. 5 and 6 in going from astern to ahead condition with relation to air pressure in the system.

FIG. 11 is an elevation with parts in section of a jacking device for use with the reversible gear system for a marine drive.

FIG. 12 is a sectional view of an alternate form of jacking unit which may be incorporated in the reversible gear system for a marine drive.

FIG. 13 is a sectional view of the unit shown in FIG. 12 taken along the line 13—13 of that figure.

FIG. 14 is a sectional view of the combined brake and clutch unit of FIG. 10.

DESCRIPTION OF THE PREFERRED EMBODIMENT

Figure 15:
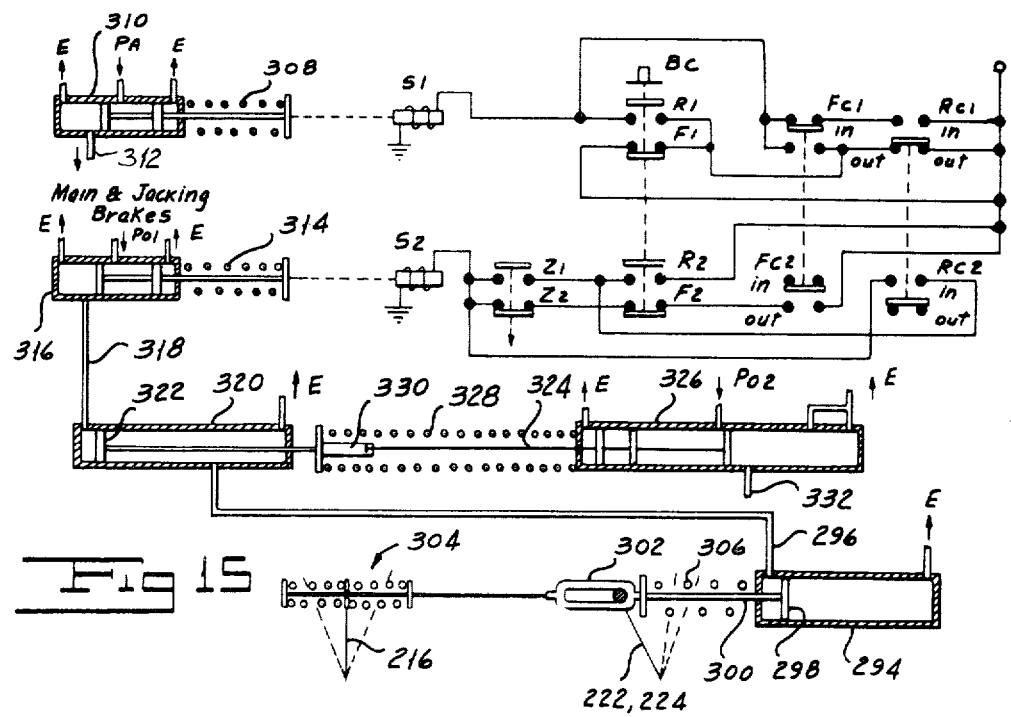
FIG. 15 is a schematic view of one form of control system which can be used to control the reversible drive of FIG. 10.

Referring now to FIGS. 1 and 2 of the drawings, a vessel such as a destroyer or the like with which my system is employed includes a screw or propeller shaft 10 carrying a bull gear 12. Clutch piece 36 and end of shaft 22 are supported by either internal or external bearings. Gear 12 is adapted to be driven from one or more gas turbine shafts 14 through respective gear systems, indicated generally by respective reference characters 16 and 18. While I have shown two gear systems associated with two turbine shafts it will readily be appreciated that one or more than two turbines may be employed to drive the gear 12. Since both gear systems 16 and 18 are substantially identical only one of the systems will be described in detail.

The system 16 is adapted to drive the bull gear 12 and the shaft 10 in the forward direction or in the reverse direction from the turbine output shaft 14. A flexible coupling 20 of any suitable type known to the art connects shaft 14 to a gear system input shaft 22 rotatably supported on a pair of bearings 24 and 26. I secure the input or driver element 28 of a high speed gear system clutch, indicated generally by the reference character 30, for rotation therewith. Clutch 30 includes an output or drive member 32. I secure the input or driver member 34 of a low speed or reversing clutch indicated generally by the reference character 36, to the shaft 22 for rotation therewith. Clutch 36 includes an output or driven member 38.

I fix the driven member 38 to the reverse drive gear 40 and support the assembly for rotation on spaced bearings 42 and 44. It will be appreciated that the shaft 22 extends through the bearings 42 and 44 as well as through the driven member 38 and gear 40 in the embodiment illustrated in FIG. 2. Gear 40 directly engages the bull gear 12 so as to drive gear 12 and shaft 10 in the reverse direction, indicated for example by the broken line arrows in FIG. 2, in the manner described hereinafter.

Driven member 32 of the clutch 30 is adapted to drive the bull gear 12 from an input gear 46 through a split parallel gear train comprising respective branches, the first of which is indicated generally by the reference character 48. I secure the driven member 32 to the input gear 46 and support this sub-assembly on spaced bearings 50 and 52. It will further be appreciated that shaft 22 passes through bearings 50 and 52 as well as through the gear 46 and the driven member 32 of the clutch 30.

Gear 46 engages an intermediate gear 54, carried by a shaft 56 for rotation therewith. Four spaced bearings 58, 60, 62, and 64 rotatably support shaft 56 and the gears carried thereby. Shaft 56 further supports for rotation therewith the output gear 66 of the system 48. Gear 66 directly engages the bull gear 12 so as to drive the same when the forward drive clutch 30 is energized in a manner to be described. The forward drive direction is indicated by the full line arrows in FIG. 2.

Gear 46 also engages the parts second intermediate gear 63, secured to a shaft 70 for rotation therewith. Respective bearings 72, 74, 76 and 78 rotatably support the shaft 70 and the gears carried thereby. Shaft 70 also carries for rotation therewith an output gear 80 adapted to engage the gear 12 to drive the shaft 10 in a forward direction disengaged the clutch 30 is energized. It will be appreciated that for the forward drive system I have provided two intermediate shafts 56 and 58 which are spaced and which are generally parallel each to the other.

I provide respective air flex brakes 82 and 84 associated with the shafts 56 and 70. Since both the air flex brakes 82 and 84 are substantially the same, I will describe only one of the brakes in detail. The brake 82 associated with shaft 56 includes a drum 88 secured to the shaft for rotation therewith by means of a suitable coupling 86. The brake housing 94 houses shoes 90 as well as a pair of inflatable members 92 associated with the shoes. As is known in the art, when the members 92 are supplied with air under pressure the inflatable members engage the shoes 90 with the drum to brake the shaft 56.

In the structure just described clutches 30 and 36 are overrunning clutches of any suitable type known to the art. Synchronizing clutches may be used but they must be able to be declutched or locked open under idle torque condition.

Referring now to FIGS. 3 and 4 there is shown one embodiment of a shifting clutch system for alternately coupling the ahead and astern drive gear systems shaft 22 which, in this embodiment, is coupled through an overrunning clutch (not shown) to the turbine shaft. The ahead clutch indicated generally by reference character 160 in the form of my system shown in FIG. 3 includes an ahead driven member 161 carrying the ahead input pinion 46 as well as a driver member 162 which is supported for limited sliding movement in the axial direction on shaft 22 by means of an axially extending spline 166 disposed in a recess 168 on shaft 22. A power spring 170 bears between the member 162 and a shoulder 172 on shaft 22 normally to urge the member 162 to the right to engage it with the ahead driven member 161.

The reversing power piston 174 is formed as an integral part with a quill 176 which surrounds shaft 22 and which is guided for movement therealong by a spline 178 directed at an angle to the direction of the axis of shaft 22. Piston 174 is received in a cylinder 180 formed as an integral part with or secured to shaft 22 for rotation therewith. Air under pressure is adapted to be supplied through a shaft passage 182 to the interior of cylinder 180 to drive piston 174 to the left. In the absence of air under pressure supplied to passage 182 a spring 184 returns the piston 174 to the position illustrated in FIG. 3. The astern driver member 186 is supported on an axially extending spline 188 located on the quill 176. An engaging spring 190 bearing between the quill 176 and the driver member 186 moves it into engagement with a driven member 187 carrying reverse pinion 40 when fluid under pressure is supplied through passage 182 to the interior of cylinder 180. A locking element 188 is secured to quill 176 for movement therewith. An axial spline 198 on the ahead driver member 162 engages the lock 194. Teeth 200 on the lock 194 to engage teeth 202 on the ahead driven member 161 in a manner to be described.

I incline the teeth of each of the pinions 162, 161, 187 and 186 at an angle to the direction of relative movement as they are brought into engagement. In addition, I curve the trailing edges of the teeth with reference to the direction of rotation of the member. For example, referring to FIG. 4 in which the direction of rotation is indicated by arrow A, the teeth 204 of the ahead driver member 162 are inclined at an angle to the direction of engagement indicated by the arrow B. Moreover, the leading edges of the teeth 204 are curved at 206 with reference to the direction of rotation of the member 162 indicated by the arrow A.

Assuming that the parts of the assembly shown in FIG. 3 are in the forward drive condition in which a clutch 160 is engaged and that it is desired to reverse the direction of drive, air under pressure is supplied to the system brakes to stop shaft 22. Next, fluid under pressure is applied to piston 174 through line 182 to move the piston to the left along the axially inclined splines 178. After one-half inch of movement of the piston, the astern clutch driver 186 contacts the driven pinion 187. At the same time the piston moves the locking member 194 out of engagement with the ahead driven member 162. At 1½ inches of movement of piston 174 the piston has rotated to a position at which the teeth of the astern clutch member 186 are aligned with the teeth of the member 187 and the two mesh after 2 inches of movement. Upon further movement of piston 174 to the left and with member 187 braked the shaft 22 rotates backwards to force the ahead clutch member 162 out of engagement with the member 161 through the medium of locking element 194. At 5 inches of movement of the piston 174 the ahead clutch element 162 is moved fully out of engagement with the ahead driven pinion 161 and the astern clutch is held by air pressure.

If it is desired now to return to a forward driving condition the source of air under pressure is disconnected from line 182. Under this condition piston 174 moves to the right under the influence of spring 184 as a result of the wedge action of the angularly inclined spline 178 under the influence of the turbine idle torque. During the first one-half inch of movement of the piston 174 spring 172 moves member 162 into contact with the pinion 161. After 1½ inches of movement of piston 174 the quill shaft 176 rotates in the ahead direction by the spline 178 to place the ahead clutch member 162 into alignment so that it may mesh with the driven member 161 under the action of spring 170. After 2½ inches of movement of the piston 174 the quill shaft is permitted to rotate ahead by means of the spline and the ahead clutch moves into engagement owing to the angle of the teeth 206. Upon further movement up to 2½ inches of piston 174, the angle spline permits further rotation ahead of the quill shaft and the astern clutch disengages. At 5 inches of movement of the piston 174 the astern clutch is fully out of engagement with its pinion and the ahead lock 144 engages. Both spring 184 and spring 170 hold the ahead clutch engaged 160 and locked against disengagement owing to thrust reversal or vibration.

Referring now to FIGS. 5 and 6 I have shown another embodiment of a clutch assembly for alternatively clutching the forward input gear 46 or the reverse gear 46 to the shaft 22. A bearing 96 disposed in a recess 98 in the shaft 22 receives the hub 100 of the high speed input gear 46. I form the driven member 102 of the high speed or ahead clutch indicated generally by the reference character 104, as an integral part with the hub 100. The driver member 106 of clutch 104 is supported on shaft 22 by means of splines 108, which are at an angle to the direction of the axis of shaft 22. A hollow piston 114 surrounds the shaft 22 and is supported thereon by means of splines 116, which also are arranged at an angle to the direction of the axis of the shaft. A guide 117 on shaft 22 guides piston 114 in its movement. I provide the end of the piston 114 adjacent the driving member 106 with teeth 120 adapted to engage teeth 122 as piston moves to the right as viewed in FIG. 5. A stop 124 on the piston limits its movement to the left as viewed in FIGS. 5 and 6. A passage 126 running in the direction of the axis of shaft 22 is adapted to be supplied with air under pressure to supply air to the inside of the hollow piston 114.

Another bearing 128 on shaft 22 receives the hub 130 of the reverse input driving gear 40. I form the driven member 132 of the reverse driving clutch 134 as an integral part of the hub 130. The driving member 136 of the clutch 134 is supported on splines 138 directed at an angle to the direction of the axis of shaft 22 and carried by a hollow piston 140 surrounding shaft 22. Axially extending splines 142 support the piston 140 on the shaft 22 for movement therealong and for rotation therewith.

The arrangement shown in FIGS. 5 and 6 differs from that shown in FIGS. 3 and 4 in that the clutch teeth of each of the clutches 104 and 134 are axially directed. The angularly inclined splines 108 and 138 which support the driving members of these clutches hold the coupling teeth in engagement under load. The bearings 96 and 128 on shaft 22 maintain linear alignment and permit only angular misalignment. The axial teeth of the clutches serve as flexible couplings for angular misalignment. Moreover the mechanical tie between the clutches shown in FIGS. 3 and 4 has been replaced by an air piston 114 in FIGS. 5 and 6.

As the driving clutch member 136 moves to the left from the position shown in FIG. 5 to the position shown in FIG. 6, teeth 144 on the driven member 132 engage teeth 146 on the driving member 136. A spring 152 extending between the head 154 of piston 140 and the end of a cylinder 148 formed on the end of shaft 22 normally urges the piston 140 to the right as viewed in FIGS. 5 and 6. An auxiliary spring 156 located in a recess 158 in the driving member 136 urges the driven and driving members into engagement. A passage 150 leading from the bore 126 is adapted to introduce air under pressure into the space between the piston head 154 and the end of the cylinder 148.

A power spring 118 extends between the shoulder 117 on shaft 22 to the piston 114 normally to urge the piston to the right as viewed in FIGS. 5 anf 6. An engaging spring 121 extends between the psiton 114 and the drive member 106 to bring piston into engagement with the driven member 102 in the manner to be described.

In the ahead running condition of the piston and cylinder assembly shown in FIG. 5, spring 118 has moved piston 114 to the right to engage teeth 120 with teeth 122 and the engaging spring 121 has engaged teeth 110 with teeth 112 to couple the ahead piston 114 to the shaft 22. At the same time spring 152 has moved piston 140 to the right to draw the member 136 out of engagement with member 132. In this condition of the system line 126 is connected to exhaust.

In order to move the parts from the ahead condition illustrated in FIG. 5 to the reverse condition illustrated in FIG. 6, air under pressure is supplied to line 126. This pressure is introduced into the space between shoulder 117 and piston 114 to move the piston to the left. As the piston moves to the left teeth 120 first are disenegaged from teeth 122. Next the stop 159 engages the driver member 106 to move it to the left to draw the teeth 110 out of engagement with teeth 112. At the same time air under pressure from line 126 is introduced into the space between head 154 and the end cylinder 148 through the passage 150 to tend to move piston 140 to the left. As this occurs spring 152 is compressed and the piston 140 and member 136 move together to the left until teeth 146 are about to engage teeth 144. At this point spring 156 moves the member 136 relative to the piston along the inclined splines 138 to move the teeth 144 and 146 to relative positions at which they may easily engage.

If it is now desired to again drive in a forward direction the source of air pressure is disconnected from line 126. When that occurs power spring 152 first moves the teeth 144 and 146 out of engagement and then withdraws member 136 to the position shown in FIG. 5. From the condition of the parts shown in FIG. 6 power spring 118 first moves the piston 114 along the angularly inclined splines to rotate teeth 120 to positions relative to teeth 122 at which they may readily engage. The piston 114 and the member 106 then move together until teeth 110 are about to engage teeth 112. At this point the engaging spring 121 moves the member 106 along splines 108 until teeth 110 and 112 are in such a relative position that they may engage.

Referring now to FIGS. 7 to 9, I have illustrated the sequence of operations of the system shown in FIGS. 5 and 6 in changing from ahead drive to astern drive and back from astern drive to ahead drive. I have also illustrated the various pressures at which the different operations take place. Beginning with the relative positions of the parts illustrated in FIG. 5 in which the ahead drive pinion 114 is coupled to the shaft 22 through clutch 104 and assuming that it is desired to reverse the direction of drive air or other fluid under pressure is admitted into the passage 126 so as to flow into the space behind piston 140 and into the space between shoulder 117 and piston 114. Under these conditions both the pistons tend to be driven to the left as viewed in FIG. 5. As can be seen by reference FIGS. 7 and 8 at a pressure of about 20 pounds and after about one-half inch movement of the piston 140 the astern driver 136 contacts the astern driven member 132. After a short further movement the angled spline 138 rotates the member 136 so as to align the teeth 146 on member 136 with the teeth 144 on member 132. At a pressure of about 45 pounds piston 114 moves to a position at which the locking teeth 120 are out of engagement with the teeth 122 on the ahead driver 106. At about 3 inches of movement of piston 140 the astern clutch 134 is engaged. With the system braked and with the astern clutch engaged as the piston 140 moves further to the left it rotates shaft 22 in the reverse direction and backs off the ahead driven member 106 so as to disengage the ahead clutch. At about 95 pounds of pressure the ahead clutch is completely disengaged. At about 110 lbs. of pressure the piston 114 moves the ahead driver 106 completely out of engagement with the ahead driven member 102 so that the system is now set to drive in the reverse direction. When the brakes are released the bull gear and the screw shaft will be driven in the reverse direction.

To return to the ahead condition from the astern driving condition just described and illustrated in FIG. 6 the source of air under pressure is disconnected from passage 126. The pressure within the piston cylinders then decreases as illustrated in FIG. 9. First, at about 40 lbs. of pressure the spring 118 moves piston 114 to a position at which the teeth 120 and 122 contact. Upon further movement of the piston the teeth 120 and 122 rotate into alignment and finally these locking teeth engage. At about 20 lbs. of pressure the power spring 152 moves piston 140 to disengage the reverse driver 136 from the reverse driven member 132. Finally, the shaft 22 rotates the ahead driver member 106 to a position at which it engages the teeth of the driven member 102. Finally, the reverse driver member is broken away and the system is then in the ahead drive condition.

Figure 10:
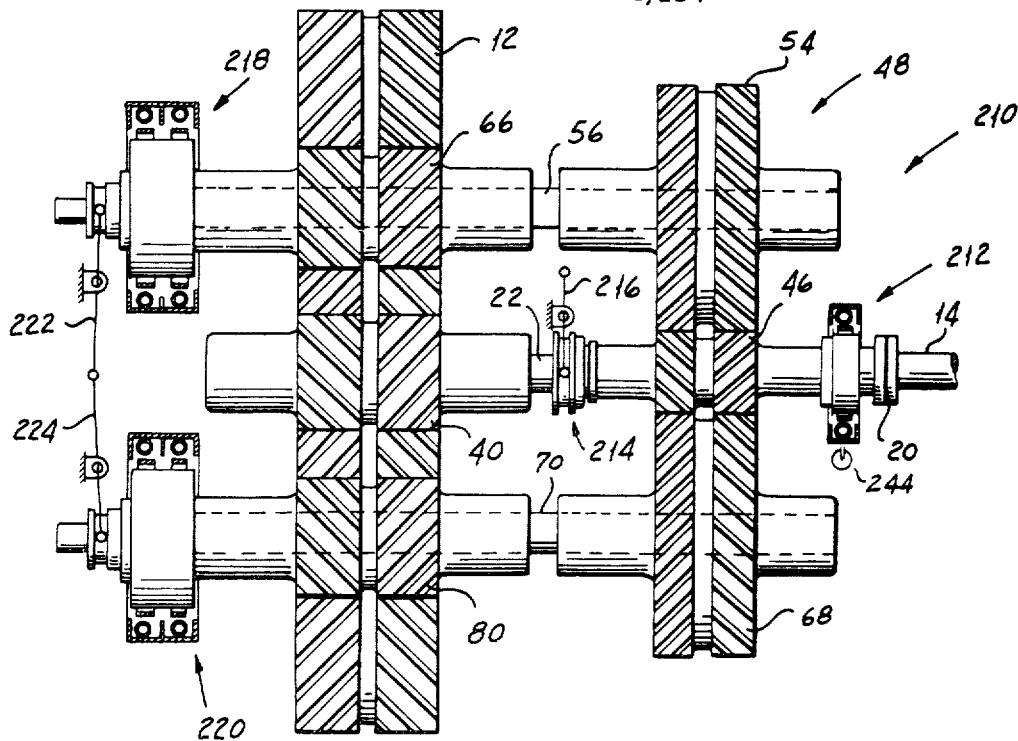
FIG. 10 is a fragmentary elevation of an alternate form of the reversible gear system for a marine drive.

Referring now to FIG. 10 an alternate form of the reversible reduction gear system for a marine drive indicated generally by the reference character 210 includes the gear 46 which meshes with intermediate gears 54 and 68 carried by shafts 56 and 70 for rotation therewith. In this embodiment, however, the gear 46 is secured to shaft 22 for rotation therewith and a clutch 214 is adapted to be actuated by a lever 216 in a manner to be described to couple the reverse drive pinion 40 to shaft 22. Further in this embodiment forward drive pinions 66 and 80 are rotatable with respect to shafts 56 and 70 and are adapted to be coupled to the shaft through the medium of respective combined airflex brake and clutch mechanisms 218 and 220, clutch portions of which are adapted to be actuated by levers 222 and 224 in a manner to be described. A requirement of this system is a jacking unit for aligning the teeth of the astern clutch 214 as well as a means for rotating the turbine shaft 14 backwards against the idle torque to release the ahead clutch. The embodiment of FIG. 10 includes such a jacking unit, indicated generally by the reference character 212, for achieving this purpose.

Referring to FIGS. 12 and 13 the jacking unit 212 includes a drum 226 carried by shaft 22 for rotation therewith. A clutch housing 228, rotatably received in a bracket 230 secured to a stationary element such as a gearcase 232, houses an inflatable ring 234 adapted to be supplied with air under pressure to clamp a shoe 236 between housing 228 and the drum 226. A fitting 238 secured to housing 228 is connected to a piston rod 240 carrying a piston 242 which is received in a cylinder 244. A spring 246 housed in cylinder 244 normally urges the parts to the position shown. With the clutch engaged and with oil under pressure supplied to the cylinder 244 below piston 242 through a port 248 the assembly is driven to the broken line position to rotate shaft 22 against the idle torque to align the reverse shift clutch 214 and to disengage the ahead clutch.

Referring to FIG. 11, an alternate form of combined clutch and jacking device indicated generally by the reference character 250 includes a sleeve 252 on shaft 22 and carrying axially extending splines 254 which receive a clutch driving member 256 for movement in the direction of the axis of shaft 22. Member 256 is adapted to be driven in the axial direction by an oil piston and cylinder arrangement (not shown) or by any other suitable means. Axially inclined splines 258 on member 256 receive a clutch driver member 260 having teeth 262 adapted to mesh with teeth 264 carried by supporting member 266 of reverse drive pinion 40. As the member 260 moves from the full line position and to the right by any conventional means (not shown) toward the broken line position, the part 260 first moves to a relative position at which teeth 262 are about to engage teeth 264, with member 256 remaining in its solid line position. Then, with axial movement of member 256, member 260 rotates by virtue of inclined splines 258 until the teeth 262 and 264 engage. With the teeth in engagement, since the pinion 40 is braked at this time the angle spline 258 rotates shaft 22 backwards against the idle torque to release the forward clutch in 218 and 220 by virtue of the angle of inclination of the teeth thereof.

Referring now to FIG. 14, the combined clutch and brakes unit 218 includes splines 268 which slidably support the clutch driver member 270 which is shifted in response to actuation of lever 222. The hub 274 of pinion 66 carries the driving member 276 of the clutch. The brake housing 278 houses inflatable tires 280 which are supplied with air under pressure to clamp shoes 282 into engagement with the drum 284 secured to member 276 to brake pinion 66 and the bull gear 12 (see FIG. 10) which meshes with pinion 66. As lever 222 is actuated, driving member 270 first shifts to a position with relation to member 276 at which ratchets 286 engage teeth 288 on member 276. Upon further relative movement of the parts, and with ratchets 286 engaged, teeth 290 on the driving member engage teeth 292 on the driven member and the clutch is engaged.

Referring now to FIGS. 10 and 15, one form of control system which may be employed to control the operation of the arrangement of FIG. 10 includes a driving cylinder 294 adapted to be supplied with oil under pressure through a line 296 to drive a piston 298, the rod 300 of which is connected to levers 222 and 224 through a lost motion connection 302 and which is connected to lever 216 through a resilient connection indicated generally by the reference character 304. A spring 306 normally positions rod 300 at a location at which the forward drive system is engaged so that in the event of failure of the oil system maneuverability is not lost.

A spring 308 normally positions the piston of an air control cylinder 310 at a location at which an outlet port 312 leading to the brakes of the units 218 and 220 and to the clutch of unit 212 is disconnected from a source of air pressure. A solenoid S1 is adapted to be energized to actuate the piston of cylinder 310 to connect the source of air pressure to port 312.

A spring 314 normally positions the piston of an oil control cylinder 316 at a location at which a source of relatively low pressure oil is disconnected from an outlet line 318 leading to a clutch control cylinder 320.

When, in a manner to be described, oil under pressure is supplied to line 318, the piston 322 in cylinder 320 is displaced to connect line 318 to line 296. At the same time, the piston drives the rod 324 of a jacking unit control cylinder 326 against the action of a spring 328 and through a dashpot 330 to connect a source of relatively high pressure oil to a line 332 leading to the inlet port 248 of the unit 212 (see FIG. 12).

Figure 16:
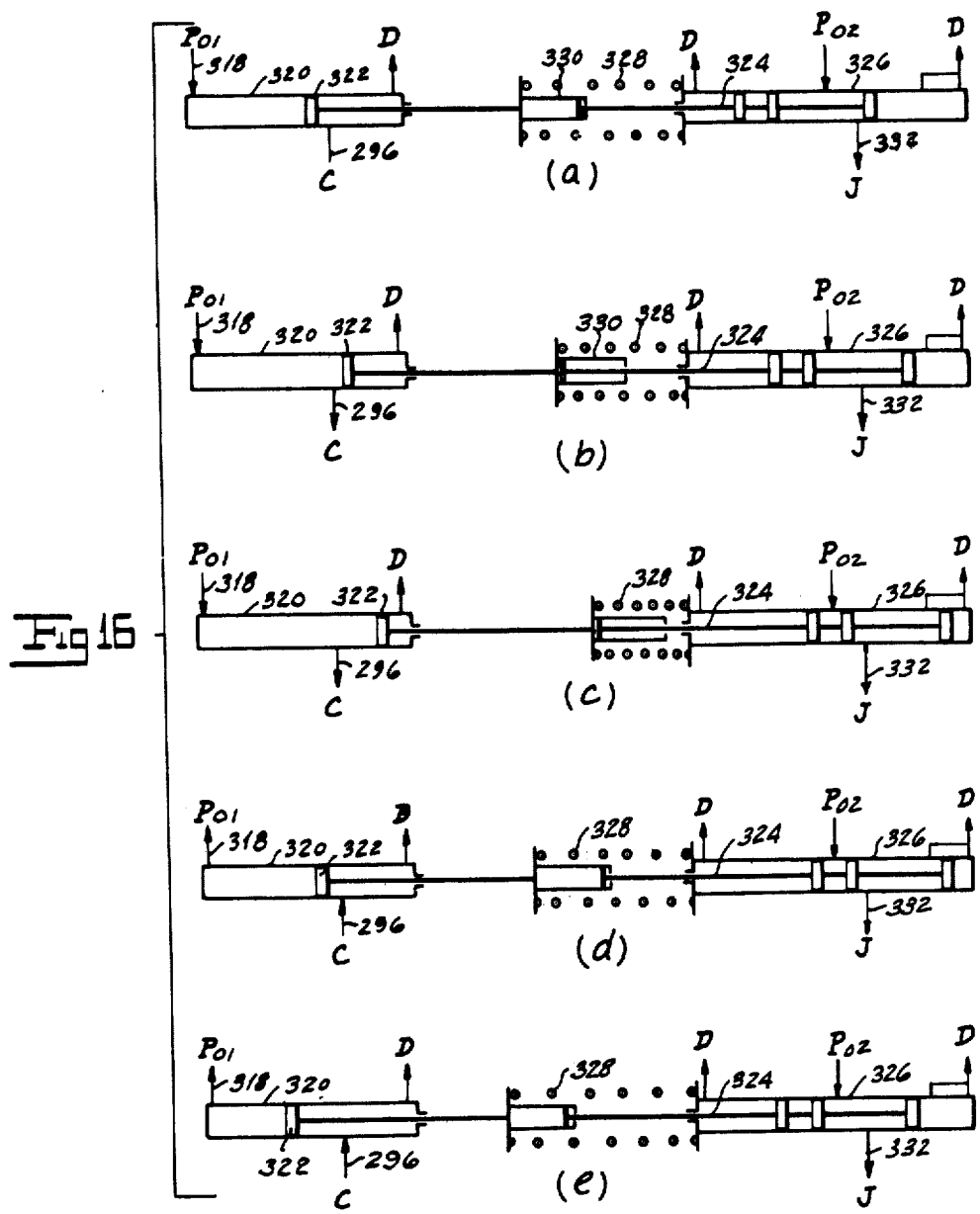
FIG. 16 is a schematic view illustrating the sequence of operations of FIG. 10.

Referring to FIGS. 10, 15 and 16, FIG. 15 shows the relative positions of the parts of the control system with the system 210 (FIG. 10) in the ahead driving condition in which units 218 and 220 are clutching pinions 66 and 80 to shafts 56 and 70 and in which reversing clutch 214 is disengaged. In this condition of the system a forward clutch limit switch having contacts FC1 and FC2 (see FIG. 15) is in the "in" position and a reverse clutch limit switch having contacts RC1 and RC2 is in the "out" position. At the same time, the bridge control switch BC closes forward contacts F1 and F2 and opens reverse contacts R1 and R2. A zero speed switch of any suitable type known to the art associated with shaft 22 is in a position at which its contact Z1 is open and its contact Z2 is closed. Under these conditions both S1 and S2 are deenergized, no air is being supplied to the brakes 218 and 220 and no oil under pressure is supplied either to the clutch operators or to the jacking unit 212.

If it is now desired to reverse the drive system, the bridge control BC is operated to open contacts F1 and F2 and to close contacts R1 and R2. When that occurs, solenoid S1 is energized through RC1 in the "out" position and cylinder 310 connects the source of air pressure to line 312. Thus, the brake portions of units 218 and 220 are activated to brake the entire system. At the same time the clutch of jacking unit 212 is activated. When the shaft stops, the zero speed switch closes contact Z1 and opens contact Z2. Upon that occurence, S2 is energized through Z1 and R2 to couple the low pressure oil line to line 318 through cylinder 316. The piston 322 is driven to a position at which the high pressure oil source is connected to line 332 and the low pressure oil source is connected from line 318 to line 296. As indicated by the uppermost diagram in FIG. 16, high pressure oil is supplied to line 332 before the low pressure oil is coupled to line 296. The high pressure oil to the jacking unit 212 rotates the shaft 22 against idle torque to align the reverse clutch 216 teeth and to disengage the ahead driven clutch 218 and 220. Finally, as indicated in the sketch next to the top in FIG. 16, the astern clutch 214 is moved to engage and finally is engaged. The system 210 is now driving in the reverse direction. When the shaft begins to turn again, the zero speed switch returns to its initial position and the circuit to S2 is held through RC2 in the "in" position to maintain oil pressure.

To return to the ahead driving condition, switch BC is operated to open R1 and to close F1. First solenoid S1 is energized through switch FC1 in the "in" condition and through F1 to supply air under pressure through line 302 to the brakes in 218 and 220 to stop the system. At the same time R2 opens to deenergize S2 to permit spring 306 to reverse the condition of the clutches 214 and in 218 and 220. When the forward clutch in 218 and 220 engages, FC1 moves from the "out" position and S1 is deenergized to release the brakes in 218 and 220. The system then is again in forward drive.

The operation of the invention will be apparent from the descriptions of the various embodiments set forth hereinabove. In each instance, mechanical springs normally urge ahead positive clutch means to engaged condition at which an ahead input pinion is coupled through split gear trains to the bull gear. At the same time, the reverse positive clutch means is urged to disengaged condition by the mechanical spring means.

When it is desired to go forward to reverse, air pressure is applied to the brakes to stop the entire system and fluid under pressure is applied to the clutch operating means to disengage the forward positive drive clutch means and to engage the reverse positive drive clutch means. In some embodiments, a jacking device is employed to rotate the input shaft against the idling torque to disengage the ahead clutch, for example. When the ahead clutch is disengaged and the reverse clutch engaged, the air pressure to the brakes is relieved and the system drives in the reverse direction. To return to the ahead drive condition, air under pressure is again supplied to the brakes to stop the entire system. Then fluid under pressure to the clutch actuating means is relieved and the mechanical spring means returns the clutch means to a condition at which the ahead clutch means is engaged and the reverse clutch means is disengaged.

It will be seen that the objects of the invention have been accomplished. There is provided a reversible reduction gear system for marine use which overcomes the defects of marine reversing drive systems of the prior art. The system is less expensive than are reversing gear systems of the prior art. It is lighter than are systems of the prior art and it occupies less space. The system fails safe. It does not necessitate dry docking for overhaul so that maintenance and repair are less expensive than with certain systems of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Reversible reduction gear apparatus for alternatively coupling an input shaft to an output shaft in a forward drive direction and in a reverse drive direction including in combination, an input shaft, an output shaft, an output gear carried by said output shaft for rotation therewith, a forward drive input gear carried by said input shaft for rotation therewith, a first intermediate shaft, a second intermediate shaft, respective intermediate gears carried by said intermediate shafts for rotation therewith, said intermediate gears meshing with said forward drive input gear, respective forward drive output pinions carried by said intermediate shafts for rotation therewith, said output pinions meshing with said output gear, a reverse drive pinion rotatably carried by said input shaft, a forward positive clutch actuatable between an engaged condition at which it couples said forward drive output pinions to said input shaft and a disengaged condition, a reverse positive clutch actuatable between an engaged condition at which it couples said reverse pinion to said input shaft and a disengaged condition, mechanical spring means normally biasing said forward clutch to engaged condition and said reverse clutch to disengaged condition, fluid pressure means for actuating said clutches against the action of said spring means to disengage said forward clutch and to engage said reverse clutch, a brake associated with one of said intermediate shafts, and control means for actuating said brake and for supplying fluid under pressure to said fluid pressure means to place said apparatus in a reverse drive condition.

2. Apparatus as in claim 1 including a second brake associated with said other intermediate shaft, said control means comprising means for concomitantly actuating said brakes.

3. Apparatus as in claim 1 in which said control means comprises means for actuating said brake and relieving said fluid pressure to permit said springs to restore said system to an ahead drive condition.

4. Reversible reduction gear apparatus for alternatively coupling an input shaft to an output shaft in a forward drive direction and in a reverse drive direction including in combination, an input shaft, on output shaft, an output gear on said output shaft, a forward drive gear carried by said input shaft for rotation therewith, a first intermediate shaft, a second intermediate shaft, respective intermediate gears carried by said intermediate shafts for rotation therewith, said intermediate gears meshing with said ahead input gear, respective ahead output pinions rotatably carried by said intermediate shafts, said ahead pinions meshing with said output gear, ahead positive clutch means actuatable between an engaged condition at which said ahead pinions are coupled to said intermediate shafts and a disengaged condition, a reverse pinion rotatably carried by said input shaft, said reverse pinion meshing with said output gear, reverse positive clutch means adapted to be actuated between an engaged condition at which said reverse pinion is clutched to said input shaft and a disengaged condition, means adapted to be actuated to brake said ahead output pinions, mechanical spring means for normally urging said ahead clutch means to engaged condition and said astern clutch means to disengaged condition and control means for actuating said braking means and for actuating said clutch means against the action of said spring means to place said system in reverse driving condition.

5. Apparatus as in claim 4 in which said control means comprises jacking means for rotating said input shaft against the action of an idling torque.

6. Apparatus as in claim 4 in which said control means comprises means for actuating said brake means and releasing said clutch actuating means to permit said spring means to restore said system to the forward drive condition.

7. Reversible reduction gear apparatus for alternatively coupling an input shaft to an output shaft in a forward drive direction and in a reverse drive direction including in combination, an input shaft, an output shaft, and output gear on said output shaft, a forward drive gear system between said input shaft and said output gear, said forward drive gear system comprising forward positive clutch means actuatable between a disengaged condition and an engaged condition at which said forward drive gear system positively couples said input shaft to said output gear, a reverse drive gear system between said input shaft and said output gear, said reverse drive gear system comprising reverse positive clutch means actuatable between a disengaged condition and an engaged condition at which said reverse drive gear system couples said input shaft to said output gear, means normally urging said forward clutch to said engaged condition and said reverse clutch to disengaged condition to couple said input shaft to said output gear in a forward drive direction, normally released brake means adapted to be actuated to brake said output gear, and control means for sequentially actuating said brake means and then disengaging said forward clutch means and engaging said reverse clutch means to couple said input shaft to said output gear in a reverse direction, and including a prime mover shaft having an idle torque coupled to said input shaft, said forward drive clutch means comprising a rotatable forward driven member operatively connected to said output gear shaft and a rotatable forward driving member operatively connected to be rotatably driven by said input shaft and actuatable to operatively engage and rotatably drive said forward driven member, said forward driving and driven members having positively interengaging elements thereon, and in which said reverse clutch means comprises a rotatable reverse driven member operatively connected to said output gear, a rotatable reverse driving member operatively connected to be rotatably driven by said input shaft and actuatable to operatively engage and rotatably drive said reverse driven member, said reverse driven and driving members having positively interengaging elements thereon, and in which said urging means comprises spring means for normally urging said forward members into engagement and for urging said reverse members out of engagement, and in which said control means comprises fluid pressure means for moving said members relative to each other against rhe action of said spring means.

8. Reversible reduction gear apparatus for alternatively coupling an input shaft to an output shaft in a forward drive direction and in a reverse drive direction including in combination, an input shaft, an output shaft, an output gear on said output shaft, a forward drive gear system between said input shaft and said output gear, said forward drive gear system comprising forward positive clutch means actuatable between a disengaged condition and an engaged condition at which said forward drive gear system positively couples said input shaft to said output gear, a reverse drive gear system between said input shaft and said output gear, said reverse drive gear system comprising reverse positive clutch means actuatable between a disengaged condition and an engaged condition at which said reverse drive gear system couples said input shaft to said output gear, means normally urging said forward clutch to said engaged condition and said reverse clutch to disengaged condition to couple said input shaft to said output gear in a forward drive direction, normally released brake means adapted to be actuated to brake said output gear, and control means for sequentially actuating said brake means and then disengaging said forward clutch means and engaging said reverse clutch means to couple said input shaft to said output gear in a reverse direction, and in which said input shaft has an idling torque and in which one of said clutch means comprises interengageable teeth, said system including jacking means for rotating said shaft against the action of said idling torque to actuate said one clutch means, and in which said jacking means comprises a cylinder, a piston disposed in said cylinder, means including a fluid clutch for coupling said piston to said shaft and in which said control means comprises means for supplying fluid under pressure to said clutch and to said cylinder for actuating said jacking means.

* * * * *